P. J. POWERS.
GRAIN MEASURING MACHINE.
APPLICATION FILED JULY 23, 1917.
1,299,861.
Patented Apr. 8, 1919.
4 SHEETS—SHEET 3.
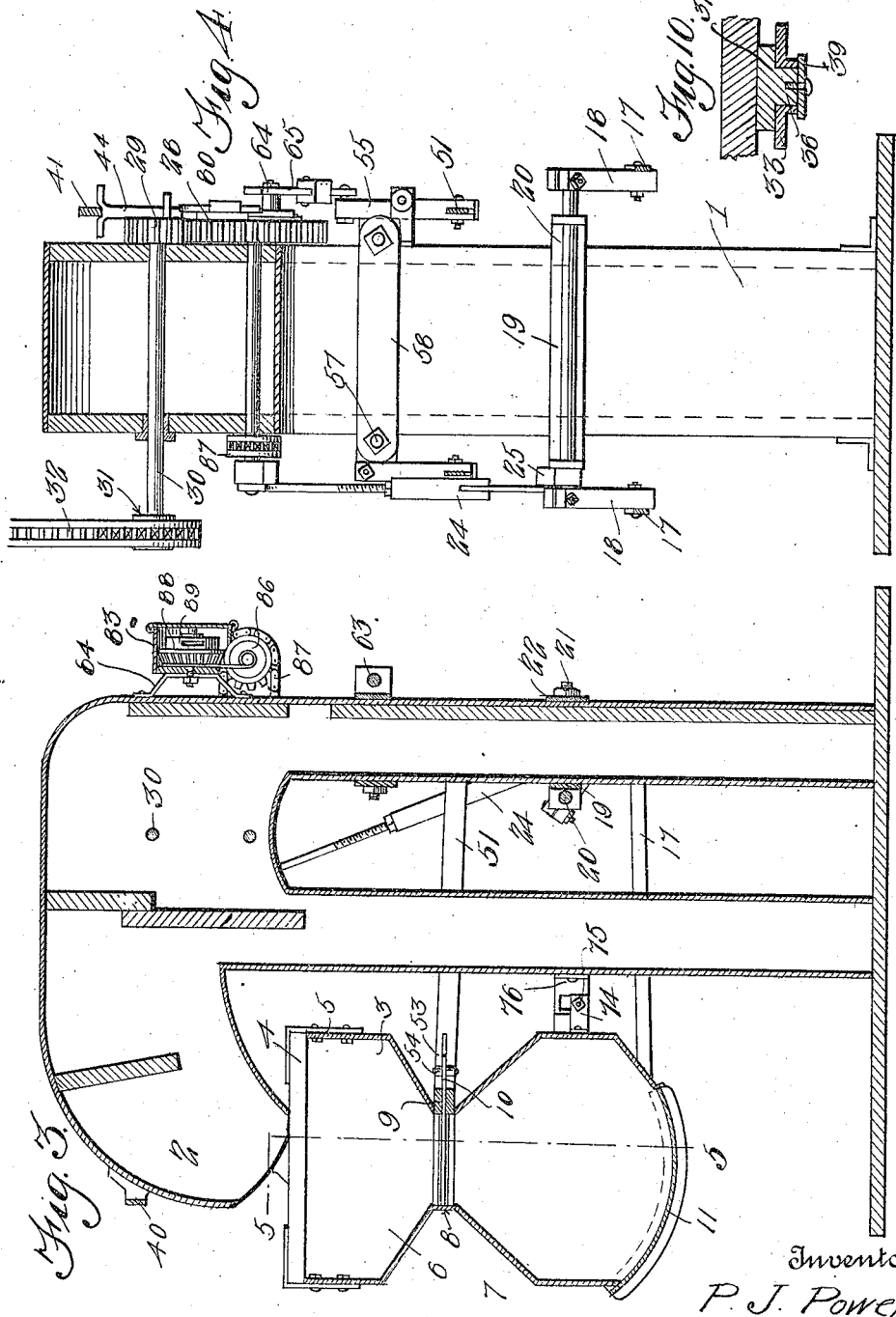
Inventor
P. J. Powers
By C. E. Trooman & Co.,
Attorney

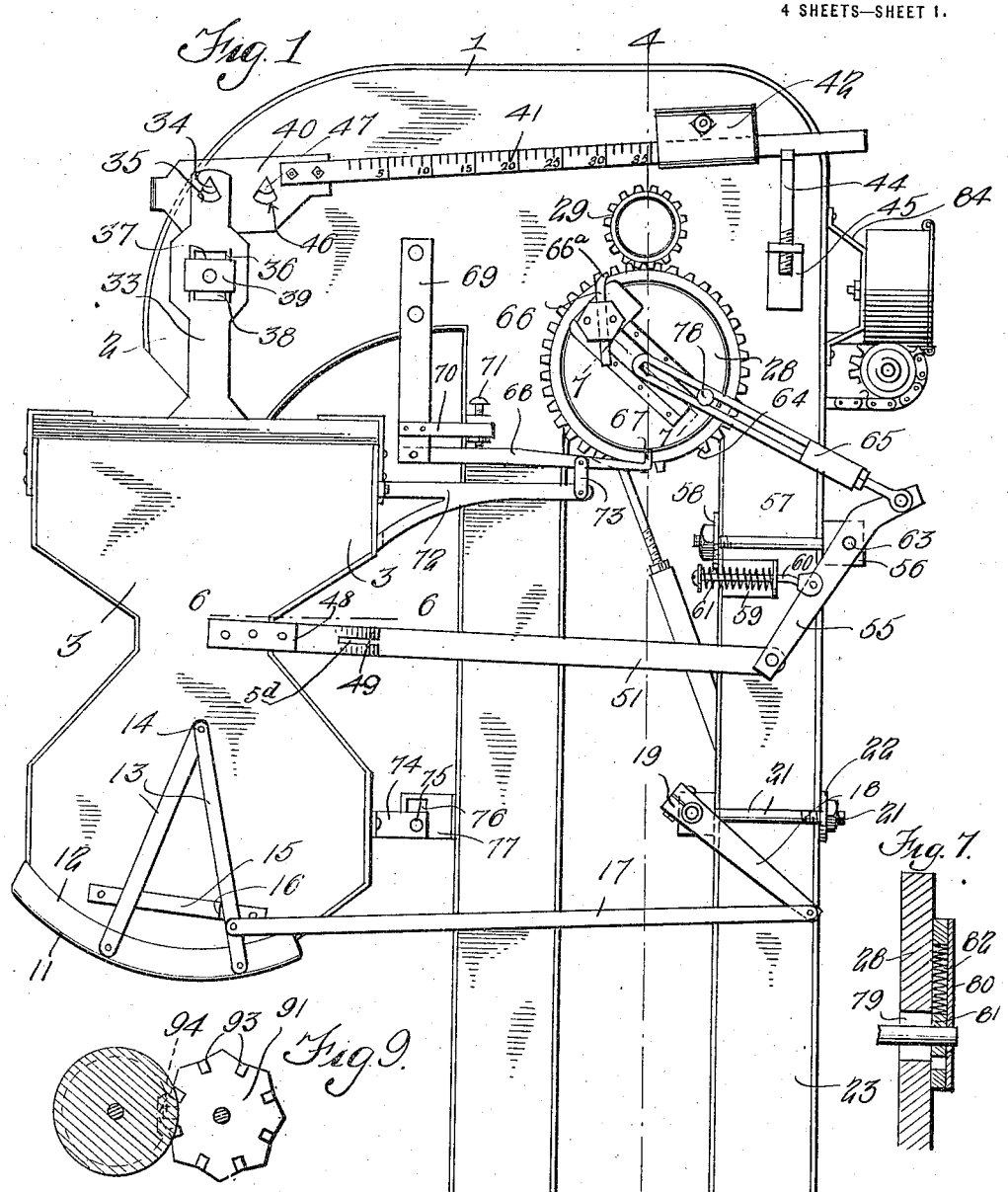

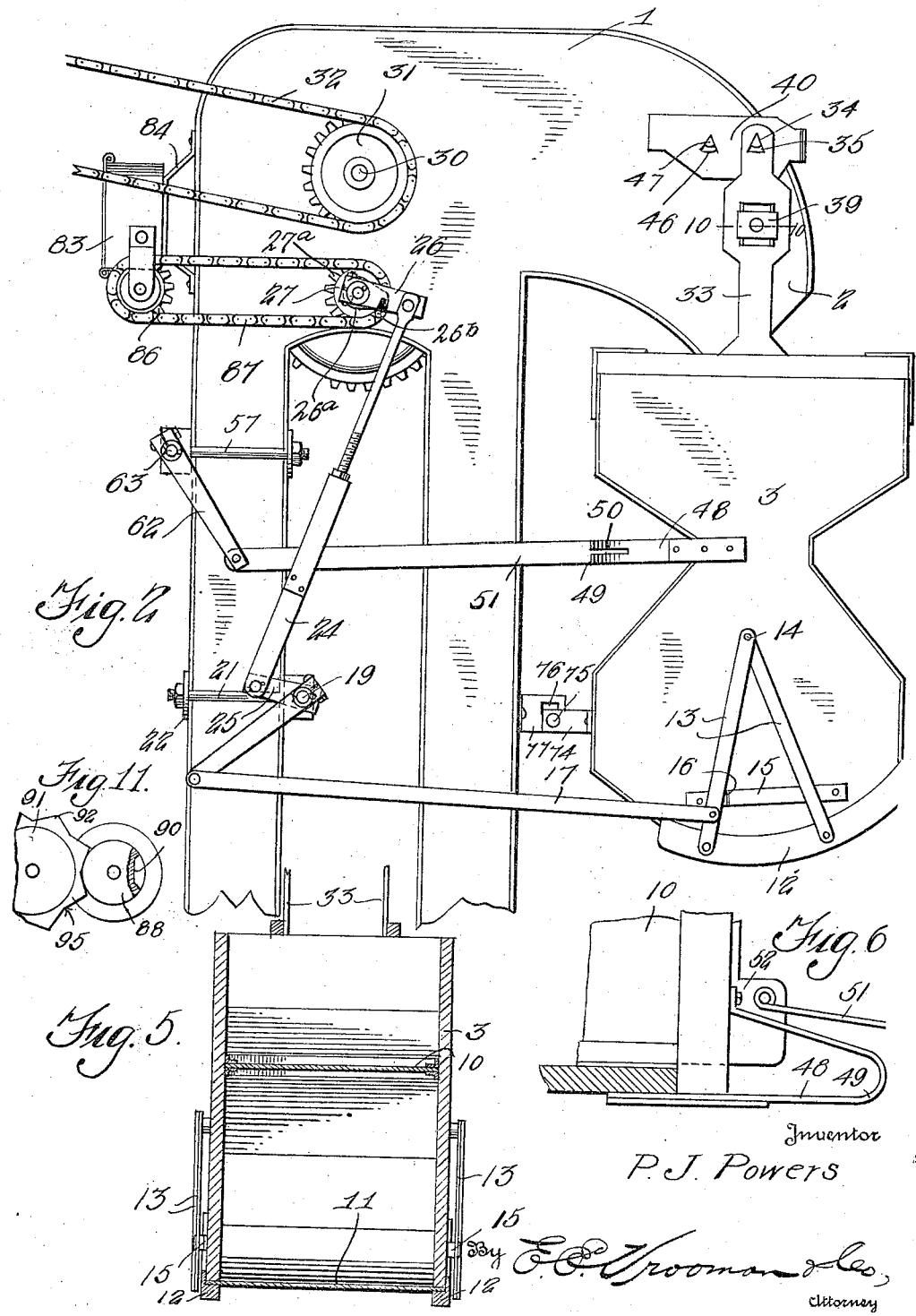

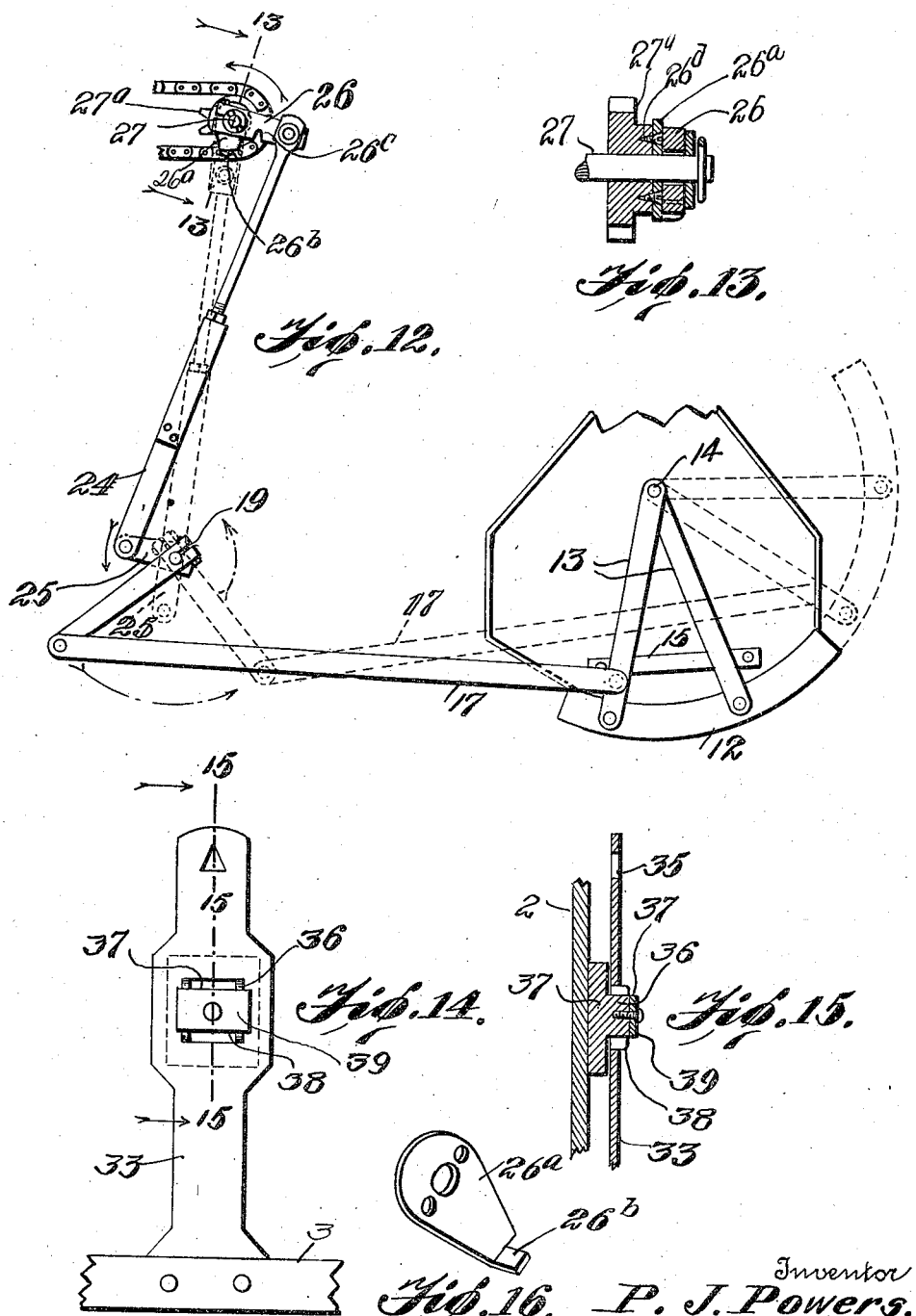

UNITED STATES PATENT OFFICE.

PATRICK J. POWERS, OF RED LODGE, MONTANA.

GRAIN-MEASURING MACHINE.

1,299,861.  Specification of Letters Patent.  Patented Apr. 8, 1919.

Application filed July 23, 1917. Serial No. 182,317.

*To all whom it may concern:*

Be it known that I, PATRICK J. POWERS, a citizen of the United States of America, residing at Red Lodge, in the county of Carbon and State of Montana, have invented certain new and useful Improvements in Grain-Measuring Machines, of which the following is a specification, reference being had therein to the accompanying drawing.

This invention relates to a grain measuring device and has for its principal object the production of a simple and efficient machine which will discharge grain therefrom in measured quantities, such as half bushel quantities, without regard to the weight of the grain.

Another object of this invention is the production of a simple and efficient cut-off which automatically prevents the discharge of more than the predetermined amount of grain from the measuring hopper.

With these and other objects in view, this invention consists of certain novel combinations, constructions, and arrangements of parts, as will be hereinafter fully described and claimed.

In the accompanying drawings:

Figure 1 is a side elevation of one side of the measuring machine.

Fig. 2 is a side elevation of the opposite side of the grain measuring machine.

Fig. 3 is a vertical section through the elevator and hopper.

Fig. 4 is a section taken on the line 4—4 of Fig. 1.

Fig. 5 is a section taken on the line 5—5 of Fig. 3.

Fig. 6 is a horizontal section, taken on the line 6—6 of Fig. 1.

Fig. 7 is a section taken on the line 7—7 of Fig. 1.

Fig. 8 is a front elevation of the register used in connection with the present invention.

Fig. 9 is a front elevation, partly in section, of the gears for actuating the indicator used in connection with the present device.

Fig. 10 is a sectional view taken on line 10—10 of Fig. 2.

Fig. 11 is a fragmentary detail view of the meshing gears in the register, attached to the front of the machine.

Fig. 12 is a fragmentary view in side elevation of the actuating device carried upon one side of the machine for operating the gate 11 that closes the lower end of the hopper.

Fig. 13 is a sectional view taken on line 13—13 of Fig. 12, and looking in the direction of the arrows.

Fig. 14 is an enlarged fragmentary view of the machine showing particularly one of the hanger arms.

Fig. 15 is a sectional view taken on line 15—15 of Fig. 14, and looking in the direction of the arrows.

Fig. 16 is a perspective view of the catch.

By referring to the drawings, it will be seen that 1 designates the elevator top, which elevator top is provided with an overhanging discharge spout 2 for the purpose of delivering grain from the elevator into the supply hopper 3 of the grain receiving compartment. This hopper 3 is braced upon the top thereof with a plurality of transversely extending bracing bars 4, which bracing bars are firmly held in engagement with the top of the hopper 3 by means of the angle straps 5. This structure is clearly shown in Fig. 3 of the drawings. The hopper 3 comprises a supply compartment 6 and a measuring compartment 7, the compartment 6 being placed above the compartment 7, and the hopper being constructed at its central portion as indicated by the numeral 8 for the purpose of constituting a valve for permitting the passage of grain from the supply hopper into the measuring hopper. A suitable guiding frame 9 is carried intermediate the supply hopper and measuring hopper, and this guide frame 9 receives the sliding valve 10, which sliding valve comprises a flat plate, said plate being adapted to cut off the supply of grain from the supply hopper into the discharge or measuring hopper. This discharge or measuring hopper is provided with an enlarged lower end and is normally closed by means of a swinging gate 11. This gate 11 is substantially concavo-convex in cross-section, and is provided with a plurality of vertically extending side flanges 12, which flanges are connected to the swinging arms 13, the arms 13 being pivotally connected at the point 14 upon the hopper 3.

A suitable latch 15 is secured to each side of the hopper 3 and is provided with an offset portion 16 behind which is adapted to fit one of the arms 13 for normally holding the swinging gate 11 in a closed position. One of the arms 13 upon each side of the hopper is engaged by means of a link 17, which link extends rearwardly of the hopper, and these links are connected by the arms 18, which arms 18 are fixedly connected to the shaft 19 extending transversely of the machine. This shaft 19 is journaled upon the bracket 20, and this bracket 20 is firmly held in engagement with the elevator 1 by means of the bolts 21, which bolts engage the plate 22, which plate 22 extends transversely across the back of the elevator, and constitutes an elevator anchoring means, as shown clearly in Fig. 1. In other words, the bolts 21, plate 22 and bracket 20 will constitute a yoke for surrounding the standard 23 of the elevator 1. It will, therefore, be seen that by partly rotating the shaft 19, the swinging gate 11 will be opened after valve 10 closes, and valve 10 closes before gate 11 which is opened; these operations of valve 10 and gate 11 will be regulated through the medium of the operation of the link arm 24, which is connected to the shaft 19 through the medium of the link arm 25, which arm 25 is fixedly connected to said shaft 19. This link arm 24 is connected by a loosely mounted crank arm 26 carried by a shaft 27, which extends transversely of the elevator frame 1, and carries a gear 28 upon the opposite end thereof. On the shaft 27 is fixedly secured the gear 27ᵃ (Figs. 12 and 13) and secured by screws 26ᵈ to gear 27ᵃ is a catch 26ᵃ, which catch 26ᵃ is provided with a right-angularly disposed lip 26ᵇ. The lip 26ᵇ is adapted to move into the notch 26ᶜ in the arm 26, as the shaft 27 and gear 27ᵃ rotates in the direction of the arrow, Fig. 12, and lift the arm 26 until the lip 66ᵃ, of fingers 66, comes in contact with the end 67 of the arm 68, when the movement of the arm 26 is temporarily locked. As soon as the lower compartment of the hopper is filled, then the weight of the load in the hopper will pull upon arm 68, releasing the finger 66, and immediately allowing shaft 27 to rotate, which will permit of the catch 26ᵃ and the loosely-mounted arm 26 to move forward, and as rotation is continued, the catch 26ᵃ, acting upon the arm 26, will, through the medium of link 24 and link 17, raise the door 11, and permit the contents of the lower compartment of the hopper to be discharged. When the contents is discharged the loosely-mounted arm 26 will be in a depending position, shown in dotted lines in Fig. 12, and since arm 26 is loosely-mounted, as soon as it has been moved by catch 26ᵃ, over the "dead center" the weight of the door 11 will cause the link 26 to move upward and thereby swing the loosely-mounted arm 26 to the position shown in full lines in Fig. 12, in which position the catch 26ᵃ picks up the arm 26 to move it around in the line of travel.

The gear 28 is operated by meshing with a pinion 29 carried by the shaft 30, and this shaft 30 carries a sprocket wheel 31 upon the opposite side of the frame 1 with respect to the pinion 29, and a suitable driving chain 32 passes over this wheel 31 for the purpose of rotating the same. It, of course, should be understood that this wheel 31 may be operated in any suitable or convenient manner to suit the desires of the operator.

By carefully considering Figs. 1 and 2 of the drawings, it will be seen that the hopper 3 is suspended upon the outer spout 2 of the elevator 1 by means of hanger brackets or arms 33. These arms 33 are formed of metal and are suspended upon the transversely extending supporting bolts 34, extending upon either side of the spout 2 and fitting in the apertures 35 formed in the hanger arms 33. These hanger arms 33 are provided with outwardly punched flanges 36, which flanges 36 constitute guides for the reduced ends 37 of the guiding blocks 38. These guiding blocks 38 are carried by the spout portion 2 of the elevator 1, and it should be understood that the arms 33 are adapted to have longitudinal sliding movement upon these blocks 38, as a retaining plate 39 is secured to the block 37 and overhangs the flanges 36 above described.

A beam supporting plate 40 is secured to the elevator 1 upon the spout 2 thereof, and is adapted to have an upward and downward swinging movement upon the spout 2, and this plate 40 comprises a substantially U-shaped body having side ends fitting snugly against the sides of the spout 2. One of the side ends of the plate 40 carries a scale beam 41, for permitting the scale weight 42, or any other suitable weight, to be placed at any desired position upon the scale beam 41.

The beam 41 is normally supported at its outer end upon the supporting bracket 44, as shown in Fig. 1, which bracket is carried by the supporting plate 45; when the measuring hopper is loaded then the beam 41 tilts upwardly for the purpose hereinafter specifically described.

By carefully considering Figs. 1 and 2, it will be seen that the plate 40 is provided with apertures 46 in the end portions thereof through which extend substantially triangular shaped bolts 47, for holding the plates 40 in engagement with the spout 2, and at the same time permitting the vertical swinging movement of the plate 40 upon the spout 2.

The guiding brackets 48 are secured to the hopper 3 and are provided with rearwardly extending end portions 49 having slots 50 formed therein through which slots 50 extend the sliding valve 10. It will further be seen that these brackets 48 will constitute an efficient guide for the sliding plate 10 and prevent twisting thereof. Operating arms 51 are secured to the projecting ends 52 of the plate 10 and these arms 51 are bifurcated at their inner ends, as indicated at 53, for permitting the rolled portions 54 thereof to fit upon the upper and lower sides of the plate 10. One of the arms 51 is pivoted to the end of the grain operating lever 55, which lever 55 is pivotally mounted upon the bracket 56, which bracket 56 is securely fastened to the elevator 1, by means of securing bolts 57, which bolts 57 pass through the locking plate 58. A bracket 59 is carried by the elevator 1, and a guiding bolt 60 passes through this bracket 59 and carries a spring 61, which spring 61 is adapted to normally pull the lever 55 forwardly at its lower end. The link 51 is connected to an arm 62 carried by the shaft 63, to which shaft 63 is also secured the arm 55 above described.

The gear 28 is provided with a blank space 64 upon the periphery thereof, the equivalent of approximately two teeth, and it should be understood that when the gear 28 rotates sufficiently to bring the blank space 64 in engagement with the pinion 29 the further rotation of the gear 28 will be discontinued. At the same time, however, when the blank space 64 rides into a position to be engaged by the pinion 29, the slotted link arm 65 will be drawn inwardly, thereby forcing the lower end of the arm 55 outwardly and pulling the sliding valve 10 to an open position, thereby permitting the grain to fall from the supply hopper into the measuring hopper. At the same time that the valve 10 is swung to an open position, the drop pin 66 carried by the gear 28 will engage at its angle end 66ª the end 67 of the pivoted arm 68, (Fig. 1) and thereby hold the gear 28 against further rotation. This arm 68 is pivotally mounted upon a hanger bracket 69, and an overhanging arm 70 is fixedly supported upon this bracket 69, and carries an adjustable pin 71, for limiting the upward movement of the arm 68.

The hopper 3 also carries a bracket 72, which bracket 72 supports a link 73, which link 73 is pivotally connected to the arm 68 near its outer end. It will further be seen that this arm 68 will assist in holding the hopper 3 in position suspended upon the elevator 1. In order that the hopper 3 may be held against swinging movement and held in its proper vertical position, a guiding bracket 74 is provided, which guiding bracket is provided with a transversely extending bolt 75 working in the vertically extending aperture 76 of the guiding bracket 77.

As soon as a predetermined amount of grain, say thirty-five pounds according to weight, has been deposited in the hopper 3, the same will descend, thereby pulling downwardly upon the arm 68 and releasing the upwardly extending end 67 of the arm 68 from engagement with the finger 66. As soon as this finger 66 is released, the force of the spring 61 will pull the arm 65 inwardly, thereby causing the link arm 65 to pull upon the pin 78 carried by the gear wheel 28, rotating the wheel 28, thereby bringing the gear into meshing engagement with the pinion 29. As the lower end of the arm 55 is swung inwardly, the arms 51 will move inwardly, thereby forcing the valve plate 10 to a closed position.

A suitable spring 82 is mounted within the frame 80 and is adapted to permit the gear wheel 28 to reciprocate upon its supporting shaft 27.

A suitable register or indicator is also provided for use in connection with the present device and comprises a frame 83, mounted upon a bracket 84. This frame 83 carries a worm screw 85, which worm screw is driven by means of a sprocket wheel 86, which sprocket wheel 86 has the sprocket chain 87. This sprocket chain also fits over the sprocket wheel 27 above described. The worm screw 85 meshes with the worm wheel 88, which worm wheel 88 is provided with a circular reduced portion 89 having a notch 90 formed upon the periphery thereof. The registry slot 91 is longitudinally mounted upon the frame 83, and this wheel 91 is provided with a plurality of spurs 92 upon the periphery thereof, which spurs are adapted to fit into the notch 90 of the wheel 88 and permit the rotation of the wheel 91 the distance of one spur at every complete rotation of the wheel 91. A plurality of lugs 93 are formed upon the inner face of the wheel 91 and are adapted to be connected by the lug 94 formed upon the adjoining face of the worm wheel 88. It should be understood that as the wheel 88 rotates under normal conditions, the portion 95 thereof will rest snugly upon the periphery of the reduced portion 89 of the wheel 88, and as soon as the notch 90 comes into contact with one of the spurs 92, one of the spurs will readily drop into the notch 90 and by the coöperation of the lugs 93 upon the adjoining face of the wheel 91, the wheel 91 will be rotated the distance of one spur. A suitable indicator end may be carried by the wheel 91 and coöperate with a suitable indicator title, for the purpose of permitting an accurate record to be kept of the number of bushels discharged from the elevator.

What is claimed is:—

1. A measuring machine of the class described, comprising a bin, said bin comprising an upper compartment and a lower compartment, an automatic valve plate slidably mounted between said compartments, and adapted to cut off the flow of material from the upper compartment into the lower compartment, and an automatic operating gate carried by said lower compartment and adapted to swing to an open position when a predetermined amount of grain has been deposited within said lower compartment.

2. A measuring machine of the class described, comprising a hopper, supporting means for said hopper, a valve plate slidably mounted upon said hopper, said hopper comprising an upper compartment and a lower compartment, a closure gate carried by said lower compartment, automatic means for swinging said closure gate in said lower compartment to an open position when a predetermined amount of grain has been deposited in said hopper, and said valve plate being adapted to be swung to a closed position for separating the grain from the delivering or upper compartment and the measuring or lower compartment.

3. A measuring machine of the class described, comprising a hopper, a scale mechanism supporting said hopper, a valve plate slidably mounted within said hopper, said valve plate adapted to cut off the supply of grain from the upper portion of said hopper to the lower portion thereof, a gate swung upon said hopper and adapted to normally close the bottom of said hopper, and means for automatically opening said gate and simultaneously closing said valve plate when a predetermined amount of grain has been deposited in said hopper.

4. A measuring device of the class described, comprising a support, a hopper supported upon said support, a scale mechanism coöperating with said hopper, a tripping gear longitudinally mounted upon said support, means for driving said tripping gear, said tripping gear provided with a supporting finger, a pivoted arm supported upon said support and adapted to engage said tripping finger for discontinuing the rotation of said tripping gear at a predetermined time, a valve plate carried by said hopper and adapted to cut off the supply of grain through said hopper, means connecting said valve plate to said tripping gear, and spring means for swinging said valve plate to a closed position when a predetermined amount of grain has been placed within said hopper, thereby releasing said pivoted arm from said tripping finger of said gear.

5. A measuring device of the class described, comprising a support, a hopper suspended upon said support, a hanger member carried by said support, a pivoted arm carried by said hanger member, a strip secured to said hopper and connected to said pivoted arm, said pivoted arm adapted to normally extend in a horizontal plane, a valve plate carried within said hopper, a tripping gear, a supporting finger carried by said tripping gear and adapted to engage said pivoted arm for locking said tripping gear against rotation in one direction at a predetermined point, lever means connecting said valve plate to said tripping gear for holding said valve plate in an open position, and spring means engaging said lever means for forcing said valve plate to a closed position when a predetermined weight has been placed in said hopper and said pivoted arm has been drawn out of engagement with said tripping finger.

6. A measuring device of the class described, comprising a support, a hopper suspended upon said support, a hanger member, carried by said support, a pivoted arm carried by said hanger member, a strip secured to said hopper and connected to said pivoted arm, said pivoted arm adapted to normally extend in a horizontal plane, a valve plate carried within said hopper, a tripping gear, a supporting finger carried by said tripping gear and adapted to engage said pivoted arm for locking said tripping gear against rotation in one direction at a predetermined point, lever means connecting said valve plate to said tripping gear for holding said valve plate in an open position, spring means engaging said lever means for forcing said valve plate to a closed position when a predetermined weight has been placed in said hopper and said pivoted arm has been drawn out of engagement with said tripping finger, and guiding brackets carried by said hopper and provided with slots formed therein, said valve plate working through said slots, and said guiding brackets being substantially V-shaped.

7. A measuring device of the class described, comprising a support, a hopper suspended upon said support, a scale beam, said hopper connected to said scale beam and adapted to have upward and downward movement, a bracket carried by said support, a pivoted arm carried by said bracket, a bracket arm connected to said hopper and being engaged near its outer end to said pivoted arm, a tripping gear carried by said support, means for operating said tripping gear, a tripping finger carried by said tripping gear and adapted to engage said pivoted arm for holding said tripping gear against rotation after the same has reached a predetermined distance, an eccentric finger secured to said gear, a link connected to said eccentric finger, a bell crank lever pivotally mounted upon said support, a valve plate carried by said hopper and slidably mounted thereon, links connected to said valve plate and also connected to said bell crank lever, spring means for pulling said bell crank lever inwardly and through said valve plate to a closed position when said pivoted arm is released from said tripping finger by a suitable amount of weight being placed within said hopper.

8. A measuring device of the class described, comprising a support, a hopper suspended upon said support, a scale beam, said hopper connected to said scale beam and adapted to have upward and downward movement, a bracket carried by said support, a pivoted arm carried by said bracket, a bracket arm connected to said hopper and being connected near its outer end by said pivoted arm, a tripping gear carried by said support, means for operating said tripping gear, a tripping finger carried by said tripping gear and adapted to engage said pivoted arm for holding said tripping gear against rotation after the same has reached a predetermined distance, an eccentric finger secured to said gear, a link connected to said eccentric finger, a bell crank lever pivotally mounted upon said support, a valve plate carried by said hopper and slidably mounted thereon, links connected to said valve plate and also connected to said bell crank lever, spring means for pulling said bell crank lever inwardly and through said valve plate to a closed position when said pivoted arm is released from said tripping finger by a suitable amount of weight being placed within said hopper, said tripping wheel provided with an elongated journaled slot, spring means mounted within said slot and adapted to permit said tripping gear to have a vertical sliding movement when undue pressure is brought to bear thereon.

9. A measuring machine of the class described, comprising a hopper, a scale beam, a frame pivotally mounted upon a support and engaging said scale beam, a plurality of hanger plates engaging said frame, guiding blocks carried by said frame, said plates provided with vertically extending slots having flanges formed upon the sides thereof, said guiding blocks engaging said slots, transversely extending bars carried by said hopper and engaging the lower ends of said plates, and valve means carried by said hopper and adapted to automatically operate when a predetermined amount of weight has been placed within said hopper.

10. A measuring device of the class described, comprising a support, a hopper supported thereon, a measuring compartment formed upon the lower end of said hopper, a gate fitting upon the bottom of said hopper, a spring latch secured to each side of said hopper, hanger brackets connected to said hopper and to said gate, and said spring latch adapted to engage one of said hanger brackets for normally holding said gate in a closed position.

In testimony whereof I hereunto affix my signature.

PATRICK J. POWERS.

Copies of this patent may be obtained for five cents each, by addressing the "Commissioner of Patents, Washington, D. C."